April 7, 1953  C. R. MONNEY  2,633,921
WIND ENGINE
Filed July 10, 1947
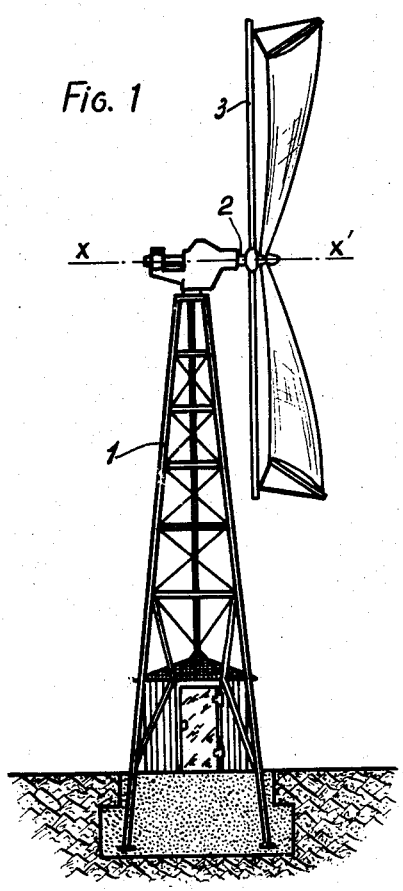
Fig. 1
Fig. 3
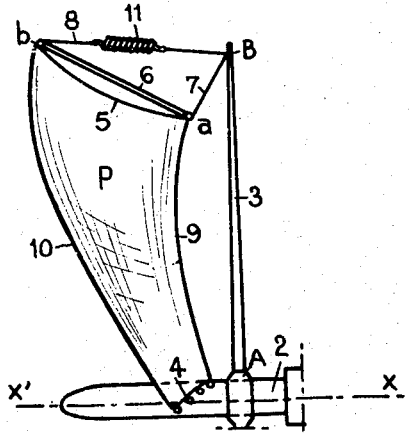
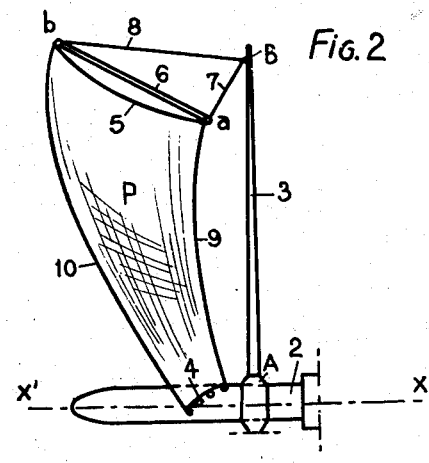
Fig. 2
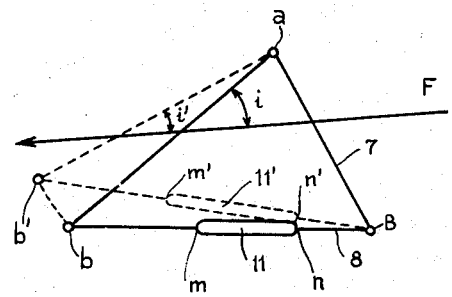
FIG. 4
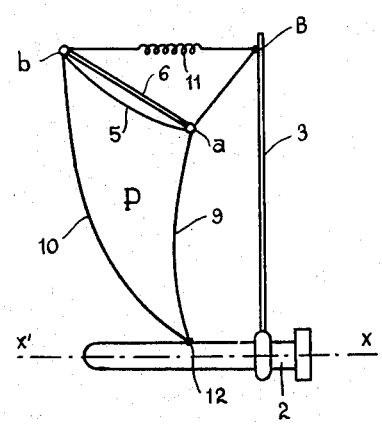
FIG. 5
Inventor
Charles Roger Monney
By Robert E. Burns
Attorney Patented Apr. 7, 1953

2,633,921

UNITED STATES PATENT OFFICE 2,633,921

WIND ENGINE

Charles Roger Monney, Paris, France

Application July 10, 1947, Serial No. 760,172
In France March 28, 1945

Section 1, Public Law 690, August 8, 1946
Patent expires March 28, 1965

6 Claims. (Cl. 170—60)

The present invention relates to a wind engine.

Above a certain length of radius, the already known wind wheels, when subjected to sudden guests of wind, take up rapidly an excess of inertia which prevents their instantaneous velocity from corresponding with the variable velocity of the wind. In other words, when the wind increases suddenly the incidence of the streams of air on the vanes increases first of all considerably owing to the fact that the velocity of rotation varies slowly. Accordingly instantaneous peaks of wind pressure are resulting which may cause breakage. Several automatic and more or less complicated devices have been invented to eliminate this danger.

The object of the present invention is to provide a vane arrangement which adjusts itself freely in all directions. Its inertia is sufficiently low to allow the vane to take up at any time with a variable wind the direction it would take under steady conditions, if the values of the velocity of the wind and the driving torque were for those conditions the same as their instantaneous values.

This result is obtained by mounting a plurality of flexibles vanes, such as canvas vanes, on a wheel comprising a rotatable hub and several shafts radially fixed to said hub, the number of said vanes being equal to that of the radial shafts, said vanes being connected to the wheel by their outer and inner edges only, and at least the connection of the outer edge comprising two cables of unequal length for connecting the corners of said outer edge of the vane to the top of the corresponding radial shaft, the cable connecting the top of said radial shaft to the corner corresponding to the leading edge of the vane being shorter than the cable connecting the top of the said shaft to the corner corresponding to the trailing edge of the vane.

Fig. 1 is a general side view of the wind engine.

Fig. 2 shows a preferred embodiment of the arrangement of a vane.

Fig. 3 shows an alternative embodiment.

Fig. 4 is a diagram corresponding to the Figure 3.

Fig. 5 shows another embodiment of the invention.

The wind engine comprises a tower 1 (Fig. 1) on which the wheel is mounted in the usual manner, so as to rotate round an horizontal axis XX' and to freely take up any position according to the wind direction. The wheel has a hub 2 and several shafts 3 radially fixed to the hub 2. Each vane P is quadrangular (Fig. 2). The inner side 4 of the vane P is fitted permanently on the hub 2. The two corners of the outer side 5 are fixed in $a$ and $b$ to the ends of a rigid rod 6 connected in B to the top of the shaft 3 by two cables 7 and 8 unequal in length.

Instead of the quadrangular vane shown in Fig. 2, a triangular vane may be used as shown in Fig. 5 of which the inner corner 12 is attached to the hub 2 of the wheel, whereas the outer edge 5 is attached to the top of shaft 3 by means of a rod 6 and cables 7, 8 in the same manner as in Fig. 2.

The angle of incidence of the relative flow of the streams of air depends only on the characteristics of the arrangement and on the selected profile. It remains constant whatever may be the running conditions. The stresses withstood by the shafts of the vanes vary therefore only as the square of the relative velocity of the air but accordingly may still be dangerous.

To avoid this danger, the holding cable 8 (Fig. 3) which extends from shaft 3 to the trailing edge 10 of the vane P is fitted with an elastic device 11 of a known type, which is initially exerting a compression or a tension (for example a spring with close turns) so that it will expand only above a predetermined value of the pressure on the canvas, that is above a certain value of the relative velocity of air. It can be seen that the effect of this deformation is to cause the trailing edge of the vane to slip away from the pressure and accordingly to reduce the angle of incidence thereby reducing the stress on the shaft 3: due to the expansion of the elastic device 11 under the action of an increased wind pressure, the length of the connection $bB$ increases, point $b$ is displaced to $b'$ (Fig. 4) and the angle of incidence, i. e. the angle formed by the direction F of the wind and $ab$ is decreased from $i$ to $i'$.

The arrangement works with a constant incidence as long as the elastic devices do not operate. As soon as they do operate however, the decrease of the angle of incidence for an increasing velocity of the wind depends upon the design of this elastic device.

As shown in Fig. 5, a triangular vane P may be used of which the inner apex 12 is attached to shaft 2 of the wheel, whereas the corners $a$, $b$, of the outer edge are attached to the outer end of the radial shaft 3 in the same manner as in Fig. 3.

It is possible without departing from the scope of the invention, to extend the lengths of the cables carrying the elastic devices to the shaft of the wheel by means of a set of pulleys or to fit the elastic device in the hub. The elastic device may then be common to all the vanes.

What I claim is:

1. A wind engine comprising a carrier, a wheel rotatably mounted on said carrier and having a hub and a plurality of shafts radially fixed to said hub, a plurality of sail shaped flexible vanes, the number of which is equal to that of the radial shafts, said vanes being connected to the wheel by their outer and inner edges only and at least the connection of the outer edge comprising two cables of unequal lengths for connecting the corners of said outer edge of the vane to the top of the corresponding radial shaft and the cable connecting the top of said radial shaft to the corner corresponding to the leading edge of the vane being shorter than the cable connecting the top of the said shaft to the corner corresponding to the trailing edge of the vane.

2. A wind engine comprising a carrier, a wheel rotatably mounted on said carrier and having a hub and a plurality of shafts fixed to said hub and extending radially therefrom, a plurality of sail-shaped flexible vanes equal in number to said shafts, said vanes being connected to the wheel by their outer and inner edges only and at least the connection of the outer edge comprising a rigid boom attached to the corners of the outer edge of the vane and two cables of unequal lengths for connecting the top of the corresponding radial shaft to the ends of said boom, the cable connecting the top of said shaft to the boom end corresponding to the leading edge of the vane being shorter than that of the cable connecting the top of the shaft to the boom end corresponding to the trailing end of the vane.

3. A wind engine comprising a carrier, a wheel rotatably mounted on said carrier and having a hub and a plurality of shafts radially fixed to said hub, a plurality of sail shaped flexible quadrangular vanes equal in number to said radial shafts, means for attaching the inner edges of said vanes to the hub of the wheel behind said radial shafts, and means for connecting the outer edge of said vanes to the corresponding radial shafts, said means comprising a rigid boom attached to the corners of the outer edge of the vane and two cables of unequal lengths for connecting the top of the corresponding radial shaft to the ends of said boom, the cable connecting the top of said shaft to the boom end corresponding to the leading edge of the vane being shorter than that of the cable connecting the top of the shaft to the boom end corresponding to the trailing end of the vane.

4. A wind engine comprising a carrier, a wheel rotatably mounted on said carrier and having a hub and a plurality of shafts radially fixed to said hub, a plurality of sail shaped flexible triangular vanes equal in number to said radial shafts, means for attaching the inner corner of each vane to the hub of the wheel behind said radial shafts, and means for connecting the outer edge of said vanes to the corresponding radial shafts, said means comprising a rigid boom attached to the corners of the outer edge of the vane and two cables of unequal lengths for connecting the top of the corresponding radial shaft to the ends of said boom, the cable connecting the top of said shaft to the boom end corresponding to the leading edge of the vane being shorter than that of the cable connecting the top of the shaft to the boom end corresponding to the trailing end of the vane.

5. A wind engine comprising a carrier, a wheel rotatably mounted on said carrier and having a hub and a plurality of shafts fixed to said hub and extending radially therefrom, a plurality of sail-shaped flexible vanes equal in number to said shafts, said vanes being connected to the wheel by their outer and inner edges only and at least the connection of the outer edge comprising a rigid boom attached to the corners of the outer edge of the vane and two cables of unequal lengths for connecting the top of the corresponding radial shaft to the ends of said boom, the cable connecting the top of said shaft to the boom end corresponding to the leading edge of the vane being shorter than that of the cable connecting the top of the shaft to the boom end corresponding to the trailing end of the vane, and resilient means inserted in the longer one of the said two cables, for allowing the length of said cable to be increased under the action of the wind pressure.

6. A wind engine comprising a carrier, a wheel rotatably mounted on said carrier and having a hub and a plurality of shafts fixed to said hub and extending radially therefrom, a plurality of sail-shaped flexible vanes equal in number to said shafts, said vanes being connected to the wheel by their outer and inner edges only and at least the connection of the outer edge comprising a rigid boom attached to the corners of the outer edge of the vane and two cables of unequal lengths for connecting the top of the corresponding radial shaft to the ends of said boom, the cable connecting the top of said shaft to the boom end corresponding to the leading edge of the vane being shorter than that of the cable connecting the top of the shaft to the boom end corresponding to the trailing end of the vane, and prestressed resilient means inserted in the longer one of the said two cables for allowing the length of said cable to be increased when the wind pressure reaches a predetermined value.

CHARLES ROGER MONNEY.

REFERENCES CITED

The following references are of record in the file of this patent:

UNITED STATES PATENTS

| Number | Name | Date |
|---|---|---|
| 16,943 | Wilson | Mar. 31, 1857 |
| 243,169 | Sprague | June 21, 1881 |
| 704,507 | Bruneau | July 15, 1902 |
| 798,845 | Ulrich | Sept. 5, 1905 |
| 1,407,373 | Brymer | Feb. 21, 1922 |
| 1,417,000 | Vogt et al. | May 23, 1922 |
| 1,777,630 | Vaughn | Oct. 7, 1930 |
| 2,015,777 | Belding | Oct. 1, 1935 |
| 2,071,513 | Everts | Feb. 23, 1937 |

FOREIGN PATENTS

| Number | Country | Date |
|---|---|---|
| 148,641 | Austria | Feb. 10, 1937 |